United States Patent
McKune et al.

(10) Patent No.: US 6,388,710 B1
(45) Date of Patent: May 14, 2002

(54) SOLID STATE CAMERA WITH SEPARATE VACUUM AND SIEVE CHAMBERS

(75) Inventors: Mark S. McKune; Stephen L. Marcus; Derek Paul Guenther, all of Tucson, AZ (US)

(73) Assignee: Photometrics, Ltd., Tuscon, AZ (US)

( * ) Notice: Subject to any disclaimer, the term of this patent is extended or adjusted under 35 U.S.C. 154(b) by 0 days.

(21) Appl. No.: 09/080,440

(22) Filed: May 18, 1998

(51) Int. Cl.$^7$ ............................................. H04N 5/225
(52) U.S. Cl. .................................................. 348/374
(58) Field of Search ................................ 348/373, 374, 348/375; 361/752; 250/370.09; 313/106

(56) References Cited

U.S. PATENT DOCUMENTS

| | | | | |
|---|---|---|---|---|
| 3,612,939 A | * | 10/1971 | Rabinowitz | 313/106 |
| 5,216,250 A | * | 6/1993 | Pellegrino et al. | 250/370.09 |
| 5,393,931 A | * | 2/1995 | Guenther | 361/752 |
| 5,598,211 A | * | 1/1997 | Fukuro | 348/374 |

* cited by examiner

Primary Examiner—Wendy R. Garber
Assistant Examiner—Luong Nguyen
(74) Attorney, Agent, or Firm—Ohlandt, Greeley, Ruggiero & Perle, LLP

(57) ABSTRACT

A small, low cost, solid state camera is achieved by the placement of the requisite molecular sieve in a chamber separate from the vacuum chamber which houses the solid state device (CCD). The sieve chamber is connected by a narrow tube to the vacuum chamber and functions as a passive pump. The sieve chamber has a removable cover which permits replacement of the sieve after manufacture.

12 Claims, 1 Drawing Sheet

SOLID STATE CAMERA WITH SEPARATE VACUUM AND SIEVE CHAMBERS

FIELD OF THE INVENTION

This invention relates to solid state cameras and more particularly to such a camera which requires a sealed or vacuum environment.

BACKGROUND OF THE INVENTION

U.S. Pat. No. 5,393,931 issued Feb. 28, 1995 discloses a camera which employs a circuit board to complete a vacuum seal and yet permit passage of electrical conduits through the board to a charge coupled device (CCD) inside a vacuum chamber. The vacuum chamber also included a molecular sieve which ensured that the requisite level of dryness was present within the chamber. The chamber was necessarily relatively large to accommodate the sieve and, of course, the sieve was not replaceable once the camera was manufactured.

BRIEF DESCRIPTION OF THE INVENTION

In accordance with the principles of this invention, the molecular sieve is placed in a separate chamber in close proximity to the vacuum tight detector chamber and connected thereto via a small conduit. The sieve chamber functions as a passive pump to remove water vapor from the detector chamber and permits the minimizing of the size of the detector chamber and the placement of the amplifier circuit close to the CCD. The sieve chamber also is vacuum tight and has a removable cover which permits the sieve to be replaced after manufacture.

DETAILED DESCRIPTION OF AN ILLUSTRATIVE EMBODIMENT OF THIS INVENTION

Figure 1:
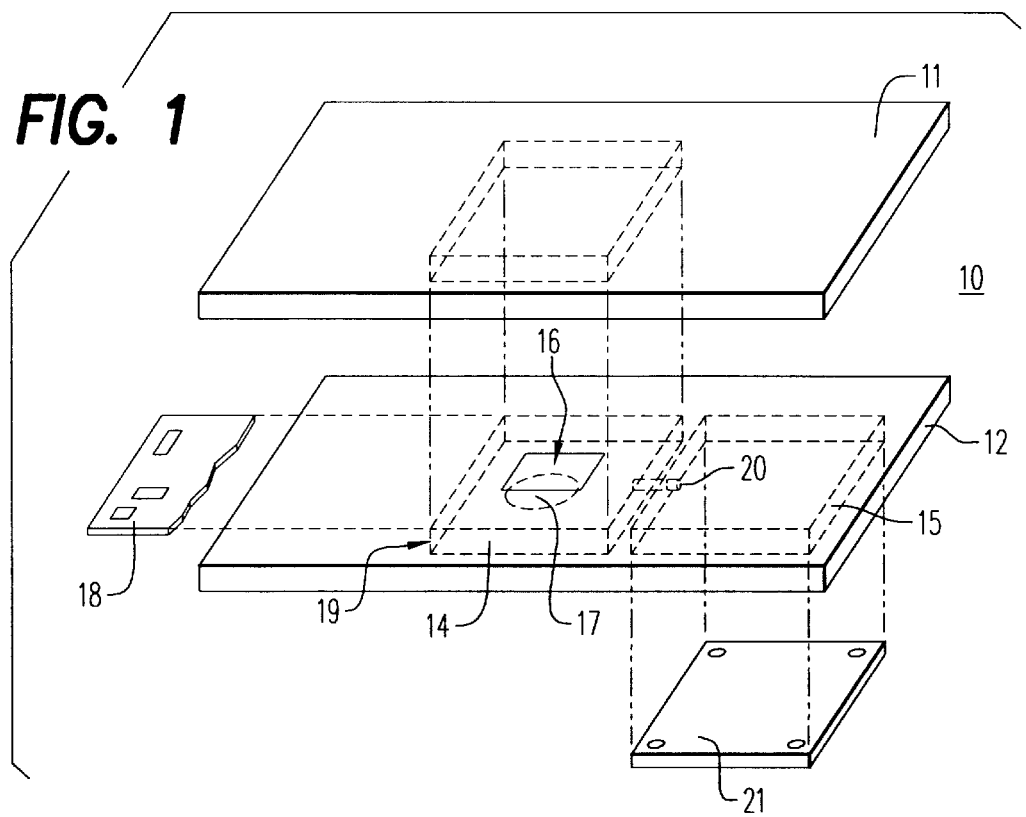
FIG. 1 is an exploded, schematic view of a solid state camera in accordance with the principles of this invention.

FIG. 1 shows an exploded view of a solid state camera 10 in accordance with the principles of this invention. The camera comprises two sections 11 and 12 which fasten together with screws. The lower section, as viewed, includes two chambers 14 and 15, the detector chamber and the molecular sieve chamber respectively.

The detector chamber includes a sensor 16 such as a charge-coupled device (CCD) operative in a well understood manner to store a light image incident thereto. The image is incident to the CCD through on optical window 17 in the underside of the camera as viewed. A circuit board 18, shown broken away, is attached to the detector chamber in a manner disclosed in the above-identified patent, dividing the detector chamber into a lower section 19 which is to be vacuum sealed and an upper section which need not be vacuum sealed as disclosed in that patent but may be sealed as is the case in commercial embodiments.

The molecular sieve chamber 15 is connected to the lower section 19 of the detector chamber by a tube or conduit 20 (which may be just a hole in the wall separating the chambers) and operates as a passive pump to remove vapor from the (vacuum) lower section 19 of the detector chamber.

Figure 2:
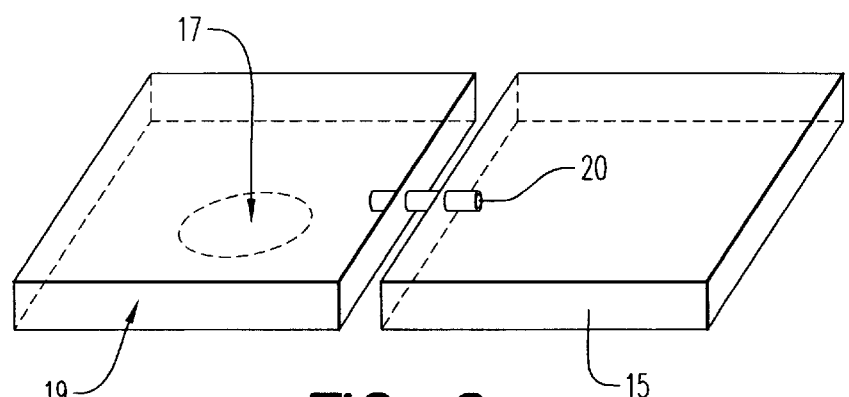
FIG. 2 is a schematic view of a portion of the camera of FIG. 1.

The sieve chamber has a cover 21 which is positioned concurrently on the downward facing surface of the camera. The cover may be removed after manufacture and the sieve replaced. There is no need to maintain a vacuum in the sieve and detector chambers although these chambers are vacuum tight and it is advantageous to fill these chambers with nitrogen after replacing the sieve. FIG. 2 shows an enlarged view of the lower section 19 of the detector chamber and the sieve chamber 15. Tube 20 also is shown in FIG. 2.

The use of a separate sieve chamber rather than locating the sieve in the vacuum chamber permits a substantial reduction in size of the detector chamber which allows electronic circuitry required to operate the detector to be placed closer to the detector without being placed into the detector chamber. Long connections between the circuits and the detector can adversely effect the low noise and stability of the camera. The reduction in detector chamber size results in a reduced sealed area which reduces the water vapor leakage rate into the detector chamber. The molecular sieve therefore has less moisture to remove over the lifetime of the camera.

A remote sieve chamber provides flexibility in the mechanical layout and form factor of a camera also.

Specifically, the camera, as available commercially, is 7.150 inch by 4.480 inch by 0.394 inch thick. The optical window is 0.900 inch in diameter. The sieve chamber is 2.4×1.69 inch.

What is claimed is:

1. A solid state camera, comprising:
    a detector chamber having an optical window therein;
    a solid state device positioned in said detector chamber in a position to capture a light image incident thereto through said optical window;
    a sieve chamber for housing a molecular sieve; and
    a wall separating said detector chamber and said sieve chamber and having a small diameter hole therethrough, wherein moisture is removed from said detector chamber through said hole.

2. A camera as in claim 1, wherein said solid state device is a charge coupled device.

3. A camera as in claim 1, further comprising a circuit board forming a face of said detector chamber and having electrical contacts therethrough for connection to said solid state device.

4. A camera as in claim 2, further comprising a circuit board forming a face of said detector chamber and having electrical contacts therethrough for connection to said charge coupled device.

5. A camera as in claim 1, wherein said detector chamber maintains a vacuum therein.

6. A camera as in claim 1, further comprising an inert atmosphere therein.

7. A camera as in claim 6, wherein said inert atmosphere is nitrogen.

8. A solid state camera, comprising:
    a detector chamber including a printed circuit board and a solid state sensor, and having an optical window therein for passing an image to said solid state sensor, said detector chamber maintaining a vacuum therein; and a sieve chamber connected to said detector chamber via a tube and acting as a passive pump, wherein moisture is removed from said detector chamber through said tube.

9. A camera as in claim 8, wherein said sieve chamber has a removable cover.

10. A camera as in claim 1 also including a tube in said hole.

11. The solid state camera of claim 1, wherein said sieve chamber has a removable cover to permit replacement of said molecular sieve.

12. The solid state camera of claim 8, wherein said solid state sensor is a charge coupled device.

* * * * *